(12) United States Patent
Lee et al.

(10) Patent No.: US 9,230,301 B2
(45) Date of Patent: Jan. 5, 2016

(54) METHOD AND APPARATUS FOR RECONSTRUCTING AN IMAGE

(71) Applicant: SAMSUNG ELECTRONICS CO., LTD., Suwon-si (KR)

(72) Inventors: Hyun-seung Lee, Seoul (KR); Seung-gu Kim, Seoul (KR); Se-Hyeok Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 13/900,995

(22) Filed: May 23, 2013

(65) Prior Publication Data

US 2013/0315504 A1 Nov. 28, 2013

(30) Foreign Application Priority Data

May 23, 2012 (KR) .................. 10-2012-0054856

(51) Int. Cl.
*G06K 9/32* (2006.01)
*G06T 3/40* (2006.01)
*G06T 7/40* (2006.01)

(52) U.S. Cl.
CPC ............... *G06T 3/4053* (2013.01); *G06T 7/401* (2013.01); *G06T 7/407* (2013.01)

(58) Field of Classification Search
None
See application file for complete search history.

(56) References Cited

U.S. PATENT DOCUMENTS

| 2009/0238492 | A1* | 9/2009 | Lenke | 382/300 |
| 2010/0329578 | A1* | 12/2010 | Hatasawa et al. | 382/218 |
| 2011/0091129 | A1* | 4/2011 | Ichihashi et al. | 382/275 |
| 2013/0170767 | A1* | 7/2013 | Choudhury et al. | 382/260 |

OTHER PUBLICATIONS

Freeman et al., "Example-Based Super-Resolution", Image-Based Modeling, Rendering, and Lighting, Mar./Apr. 2002, pp. 56-65.

* cited by examiner

*Primary Examiner* — Utpal Shah
*Assistant Examiner* — Narek Zohrabyan
(74) *Attorney, Agent, or Firm* — Sughrue Mion, PLLC

(57) ABSTRACT

A method and apparatus for reconstructing a low-resolution image is provided. The method includes magnifying a low-resolution image; extracting a high frequency component and a texture component from the pre-magnification low-resolution image; and reconstructing an image by synthesizing the extracted high frequency component and texture component with the magnified low-resolution image. The method and apparatus synthesizes only image components without a separate external DB, making it possible to enhance sharpness of the outline of images and thus effectively reconstruct fine texture components.

5 Claims, 3 Drawing Sheets

METHOD AND APPARATUS FOR RECONSTRUCTING AN IMAGE

PRIORITY

This application claims the benefit under 35 U.S.C. §119(a) from Korean Patent Application filed in the Korean Intellectual Property Office on May 23, 2012 and assigned Serial No. 10-2012-0054856, the entire disclosure of which is incorporated herein by reference.

BACKGROUND

1. Field

The present inventive concept relates generally to a method and apparatus for displaying images, and more particularly, to a method and apparatus for reconstructing images.

2. Description of the Related Art

Images may suffer from a loss of frequency components in their compression and scaling process. Due to the loss of frequency components, images with fine textures may deteriorate into images with coarse and plain textures, resulting in poor visual impressions. Many methods have been developed to compensate for this degradation. Among them, image reconstruction-based methods reconstruct the deteriorated frequency components by way of a modeling a process in which a best solution is found for images which are deteriorated. Sharpening-based methods, which are heuristic methods, amplify a magnitude of the frequency components. Although both the image reconstruction-based methods and the sharpening-based methods improve the overall image sharpness by virtue of the amplification of frequency components, there are limitations on reconstructing the high-frequency components that have already been lost, having difficulty in reconstructing even the fine textures of the original images.

FIG. 1 illustrates an image reconstruction-based method proposed by Freeman.

In FIG. 1, $Y_{LR}$ denotes a low-resolution image, $Y_{ILR}$ denotes a magnified (or up-scaled) low-resolution image, $Y_{ILR,HF}$ denotes a high frequency component of the magnified low-resolution image, and $Y_{DB,HF}$ denotes a high frequency component stored in a database (DB).

Referring to FIG. 1, information relating to a previously learned pair of image patches of an intermediate frequency and a high frequency are stored in an external DB, and an intermediate frequency component of an initially magnified image is replaced by a high frequency component through the use of the DB. That is, a high frequency component $Y_{DB,HF}$ is read from the external DB, and a blurred frequency component $Y_{ILR,HF}$ of a magnified image is replaced by the read high frequency component $Y_{DB,HF}$. In this method, the number of pieces of data to be previously learned in the DB is more than 0.2 million, and a memory for storing the learned data is required. In addition, a computation for comparing $Y_{ILR,HF}$ of the magnified image with all high frequency components $Y_{DB,HF}$ in the DB to find an optimal patch in every reconstruction is required even in a process of reconstructing an image, which are considerably complex. Even in terms of reconstruction performance, the image reconstruction-based method has limitations on reconstructing statistical components having a low correlation with surroundings, such as a texture, because it uses a Markov random field that analogizes and estimates a brightness value of a current location based on previously reconstructed surrounding brightness values. The sharpening-based method also has limitations on reconstructing high frequency components, since it is a method of amplifying frequency components.

SUMMARY

An aspect of an exemplary embodiment of the present inventive concept is to provide a method and apparatus for effectively reconstructing blurredness of an image and a loss of a texture, which occur when the image is magnified in an image reconstructing process.

Another aspect of an exemplary embodiment of the present invention is to provide a method and apparatus for effectively reconstructing an image through a relatively simple process, without using an external database.

In accordance with one aspect of the present inventive concept, there is provided a method of reconstructing a low-resolution image. The method includes: magnifying a low-resolution image; extracting a high frequency component and a texture component from the pre-magnification low-resolution image; and reconstructing an image by synthesizing the extracted high frequency component and texture component with the magnified low-resolution image.

In accordance with another aspect of the present inventive concept, there is provided an apparatus for reconstructing a low-resolution image. The apparatus includes: a scaler for magnifying a low-resolution image; an extractor for extracting a high frequency component and a texture component from the pre-magnification low-resolution image; and a synthesizer for reconstructing an image by synthesizing the extracted high frequency component and texture component with the magnified low-resolution image.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EXEMPLARY EMBODIMENTS

In the following description, well-known functions or constructions are not described in detail since they would obscure the invention with unnecessary detail. Exemplary embodiments of the present inventive concept will now be described in detail with reference to the accompanying drawings.

In reconstructing an image, the present invention includes extracting a high frequency component and a texture component from a down-scaled image or a pre-magnification (pre-interpolation) image, determining a part having a lesser sense of heterogeneity with a post-magnification (magnified or interpolated) image, and synthesizing the extracted components with the determined part. Although the present inventive concept will be described herein based on a Y-channel representing brightness for convenience of description, the present inventive concept is applicable even to a C-channel representing chroma.

Figure 1:
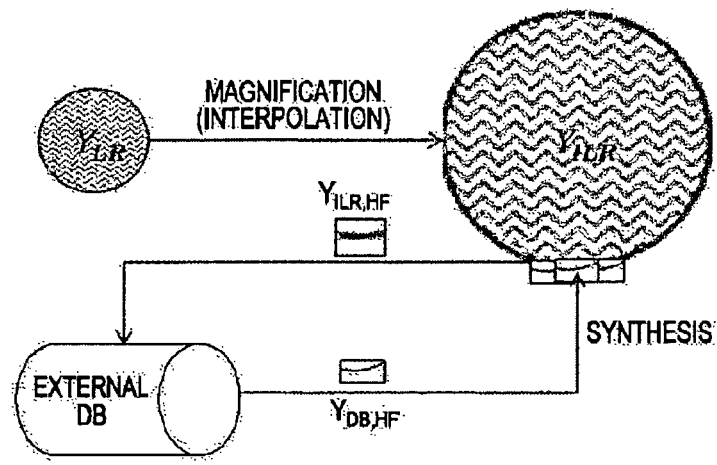
FIG. 1 illustrates a conventional image reconstruction-based method.
Figure 2:
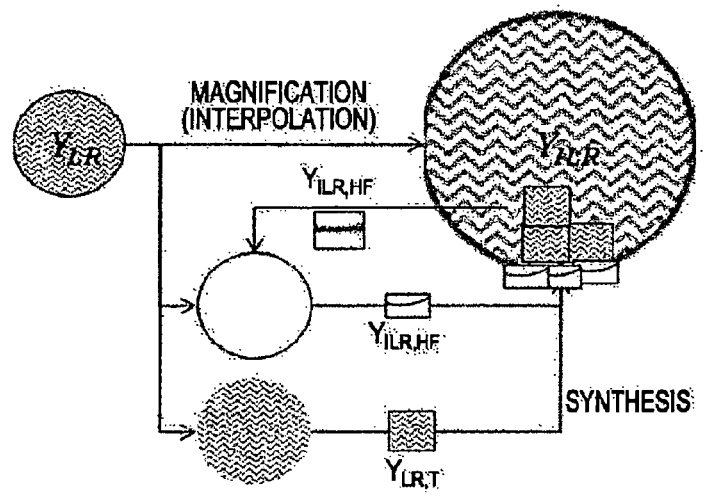
FIG. 2 schematically illustrates an image reconstructing process according to an exemplary embodiment of the present inventive concept.

FIG. 2 schematically illustrates an image reconstructing process according to an exemplary embodiment of the present inventive concept.

In FIG. 2, $Y_{LR}$ denotes a low-resolution image, $Y_{ILR}$ denotes a magnified low-resolution image, $Y_{ILR,HF}$ denotes a high frequency component of the magnified low-resolution image, $Y_{LR,HF}$ denotes a high frequency component of the low-resolution image, and $Y_{LR,T}$ denotes a texture component of the low-resolution image.

Referring to FIG. 2, a high frequency component $Y_{LR,HF}$ and a texture component $Y_{LR,T}$ of a low-resolution image $Y_{LR}$ are extracted from the pre-magnification low-resolution image $Y_{LR}$, and a blurred frequency component $Y_{ILR,HF}$ of a magnified image $Y_{ILR}$ is synthesized with the high frequency component $Y_{LR,HF}$ and the texture component $Y_{LR,T}$ of the low-resolution image $Y_{LR}$.

The image reconstructing process will be described in detail below.

In this process, the high frequency component $Y_{LR,HF}$ and the texture component $Y_{LR,T}$ are extracted from the pre-magnification image $Y_{LR}$. Only the magnified image $Y_{ILR}$ with no pre-magnification image exists, the magnified image $Y_{ILR}$ is down-sampled and used as a pre-magnification image. The high frequency component $Y_{LR,HF}$ may be separated by a process of extracting a low frequency component $Y_{LR,LF}$ of the low-resolution image $Y_{LR}$ from the low-resolution image $Y_{LR}$ using a Low Pass Filter (LPF) and subtracting the low frequency component $Y_{LR,LF}$ from the low-resolution image $Y_{LR}$, as shown in Equation 1.

$$Y_{LR,LF}=LPF(Y_{LR})$$

$$Y_{LR,HF}=Y_{LR}-Y_{LR,LF} \quad \text{[Equation 1]}$$

A high frequency component of the texture component $Y_{LR,T}$ may also be extracted in the similar way, using Equation 2. In this case, since the texture component $Y_{LR,T}$ must exclude an edge component, the texture component $Y_{LR,T}$ is extracted using a Bilateral Filter (BF) preserving an edge, instead of the LPF.

$$Y_{LR,BF}=BF(Y_{LR})$$

$$Y_{LR,T}=Y_{LR}-Y_{LR,BF} \quad \text{[Equation 2]}$$

It will be understood by those of ordinary skill in the art that the proposed methods for extracting a high frequency component and a texture component from a low-resolution image for image reconstruction are not limited to the methods given in Equations 1 and 2, and various other methods may be used in the present inventive concept.

A method of finding the most similar patch (block) between the pre-magnification low resolution image $Y_{LR}$ and the magnified image $Y_{ILR}$ will be described.

Since every image has self-similarity, the pre-magnification image $Y_{LR}$ and the magnified image $Y_{ILR}$ have a similar characteristic when they are locally observed. When a specific position (i, j) of the image $Y_{ILR}$ magnified by m×n from the pre-magnification image $Y_{LR}$ is reconstructed based on this characteristic, a search is made for an image patch which best matched with the magnified image $Y_{ILR}$ around a position (i/m, j/n) which corresponds to the pre-magnification image $Y_{LR}$. The best matching patch may be found by searching for a position at which a Sum of Absolute Difference (SAD) between corresponding brightness values is the smallest.

Equation 3 is used to calculate a SAD at a position that is apart by (α, β) from the center point when a patch size is defined by (2a+1, 2B+1).

$$SAD(\alpha, \beta) = \sum_{j=-a}^{a} \sum_{k=-b}^{b} |Y_{ILR}(i+k, j+l) - Y_{LR}(i/m+k+\alpha, j/n+l+\beta)| \quad \text{[Equation 3]}$$

In Equation 3, (α, β) denotes a comparison position. If a range of (α, β) is (−5, 5), SADs are obtained at a total of 120 positions, and a position having the smallest SAD from among the 120 positions is a center position which corresponds to the best matching patch.

A process of synthesizing a high frequency component and a texture component will be described.

A high frequency component $Y_{LR,HF}$(i/m+α, j/n+1+β) which corresponds to the center position found by Equation 3 is synthesized as a weight w with the magnified image $Y_{ILR}$. Various methods are used to obtain the weight w, and although an example of obtaining the weight w will be described below, the present invention is not limited thereto.

In general, a weight is inverse proportional to a SAD and has a specific Direct Current (DC) value. Equation 4, as a linear equation, is a method of obtaining the weight w that is inverse proportional to a SAD.

$$w = a \cdot \frac{1}{SAD} + b \quad \text{[Equation 4]}$$

In Equation 4, 'a' denotes a gradient, and 'b' denotes an intercept.

A low-resolution image and a high-resolution image are synthesized using the obtained weight w, as shown in Equation 5.

$$Y_{ILR}'(i, j)=Y_{ILR}(i, j)+w_{HF} \cdot Y_{LR,HF}(i/m+\alpha, j/n+1+\beta) \quad \text{[Equation 5]}$$

In Equation 5, $Y_{ILR}$'(i, j) denotes a result obtained by synthesizing the high frequency component $Y_{LR,HF}$ of the pre-magnification image $Y_{LR}$ at the position (i, j) of the magnified image $Y_{ILR}$.

The texture component $Y_{LR,T}$ is synthesized in the same way as the high frequency component $Y_{LR,HF}$ except that it is synthesized on a block basis rather than on a pixel basis. As the texture component $Y_{LR,T}$ is synthesized on a block basis, a texture characteristic of the pre-magnification image $Y_{LR}$ can be maintained.

Equation 6 shows a final result $Y_{ILR}$"(i, j) obtained by synthesizing the pre-magnification image $Y_{LR}$ with the high frequency component $Y_{LR,HF}$ and the texture component $Y_{LR,T}$ at the position (i, j) of the magnified image $Y_{ILR}$.

$$Y_{ILR}"(i, j)=Y_{ILR}'(i, j)+w_T \cdot Y_{LR,T}(i/m+\alpha, j/n+1+\beta) \quad \text{[Equation 6]}$$

FIG. 2 shows an example in which high frequency components overlap, and a patch of a texture synthesized on a pixel basis is synthesized on a block basis.

In addition, an image synthesized with the high frequency component $Y_{LR,HF}$ and the texture component $Y_{LR,T}$ to increase the performance of image reconstruction is initially stored in a High Resolution (HR) buffer, and the above-described process may be repeated by a pre-set number of times. That is, $Y_{ILR}=Y_{ILR}''$ is set, and the above-described process is repeated.

In the case of a moving picture, an image $Y_{n-1,ILR}''$ reconstructed in a previous frame is stored in the HR buffer, and an image may be reconstructed using a magnified image, a high frequency component, and a texture component, which are obtained from a low-resolution image in a next frame. Equation 7 is an equation for reconstructing a moving picture.

$$Y_{n,ILR}''=a\cdot Y_{n-1,ILR}''+(1-a)\cdot Y_{n,ILR}w+_{HF}\cdot Y_{n,LR,HP}+ w_T\cdot Y_{n,LRT} \quad \text{[Equation 7]}$$

In Equation 7, $Y_{n,ILR}''$ denotes an image reconstructed in an n-th frame, and 'a' denotes a percentage at which an image reconstructed in a previous frame is used.

Figure 3:
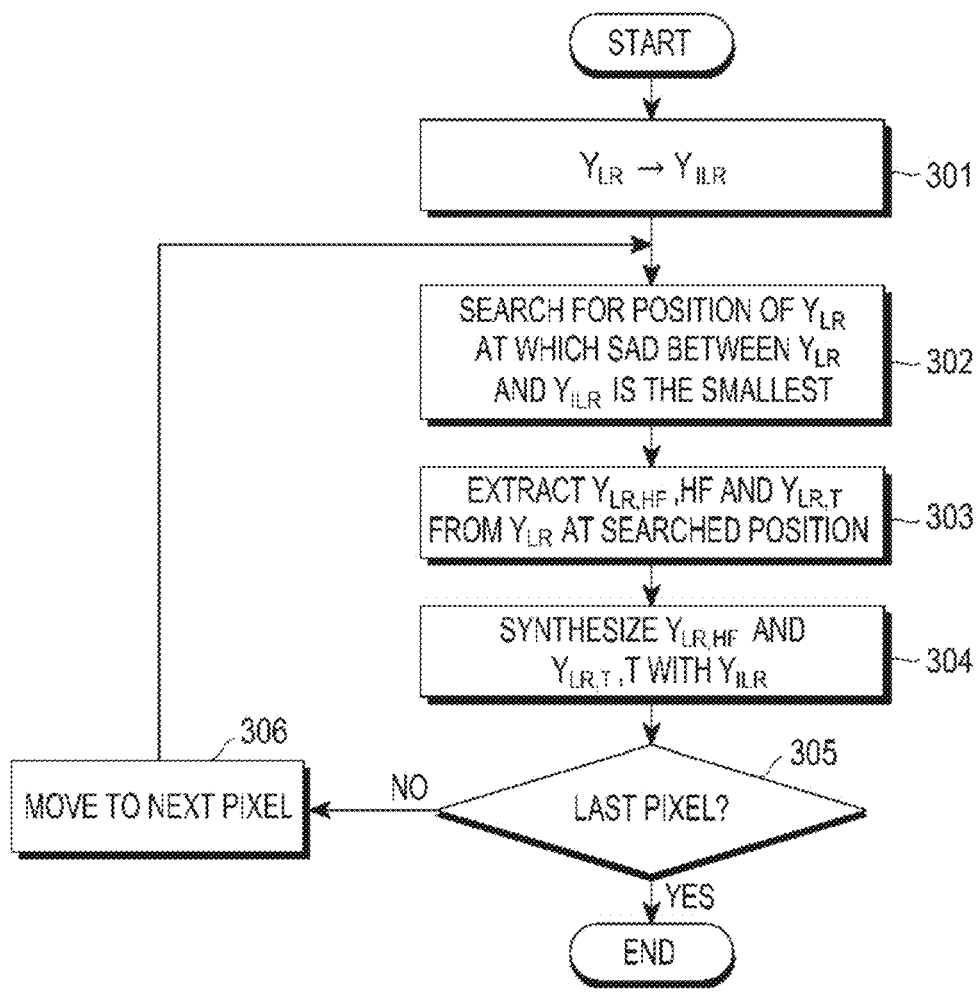
FIG. 3 is a flowchart illustrating an image reconstructing process according to an exemplary embodiment of the present inventive concept.

FIG. 3 is a flowchart illustrating an image reconstructing process according to an exemplary embodiment of the present inventive concept.

Referring to FIG. 3, an image $Y_{ILR}$ is obtained by magnifying a low-resolution image $Y_{LR}$ in step 301, and a position of $Y_{LR}$ at which an SAD between pixel brightness values of $Y_{LR}$ and $Y_{ILR}$ is the smallest is searched for in step 302. A high frequency component $Y_{LR,HF}$ and a texture component $Y_{LR,T}$ of the low-resolution image $Y_{LR}$ are extracted from the low-resolution image $Y_{LR}$ at the searched position in step 303, and the extracted high frequency component $Y_{LR,HF}$ and texture component $Y_{LR,T}$ of the low-resolution image $Y_{LR}$ are synthesized with the magnified low-resolution image $Y_{ILR}$ in step 304. It is determined in step 305 whether a current pixel is the last pixel. If the current pixel is the last pixel, the image reconstructing process ends. Otherwise, if the current pixel is not the last pixel, the image reconstructing process moves to a next pixel in step 306. Thereafter, steps 302 to 305 are repeated.

Figure 4:
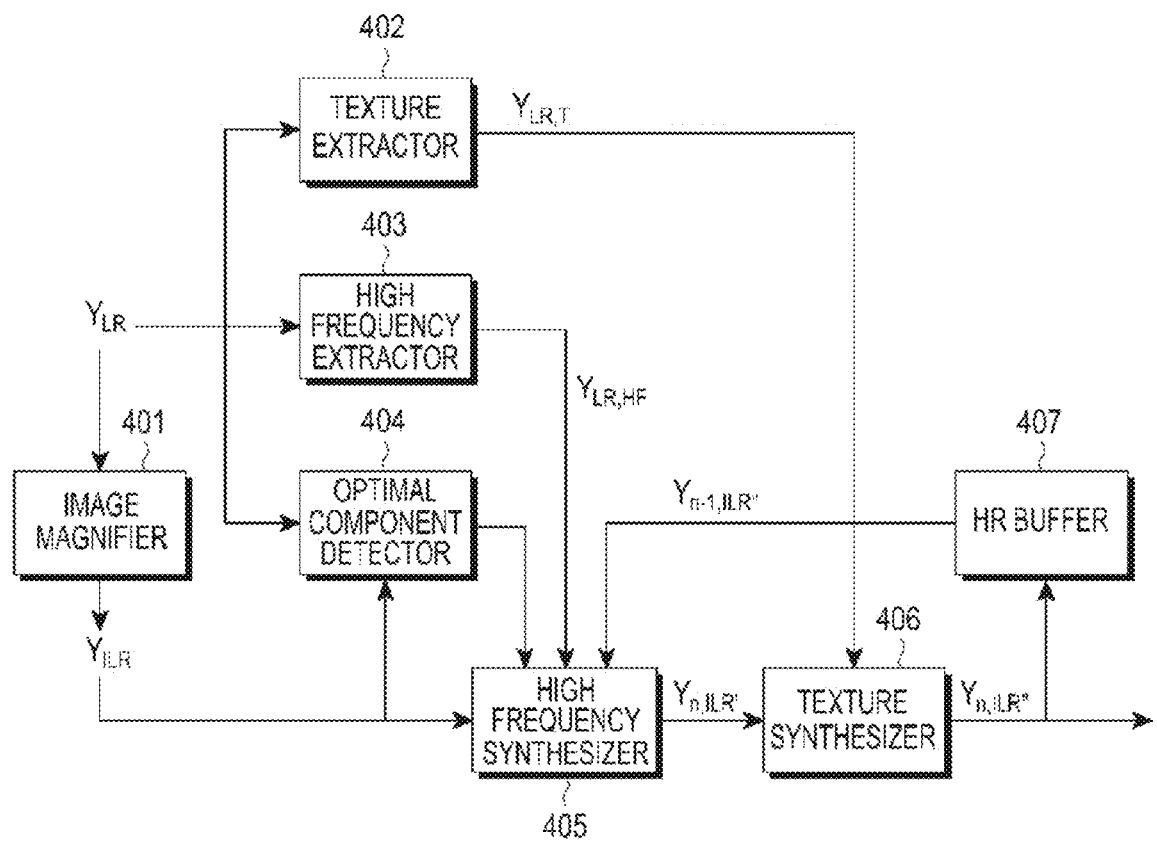
FIG. 4 is a block diagram of an image reconstructing apparatus according to an exemplary embodiment of the present inventive concept.

FIG. 4 is a block diagram of an image reconstructing apparatus according to an exemplary embodiment of the present inventive concept.

Referring to FIG. 4, a low-resolution image $Y_{LR}$ is magnified by an image magnifier 401, and $Y_{ILR}$ is output, which is input to a high frequency synthesizer 405. In addition, the low-resolution image $Y_{LR}$ is input to a texture extractor 402, a high frequency extractor 403, and an optimal component detector 404. The texture extractor 402 extracts a texture component $Y_{LR,T}$ from $Y_{LR}$ using a BF and outputs the extracted texture component $Y_{LR,T}$ to a texture synthesizer 406, and the high frequency extractor 403 extracts a high frequency component $Y_{LR,HF}$ from $Y_{LR}$ using an LPF and outputs the extracted high frequency component $Y_{LR,HF}$ to the high frequency synthesizer 405. The optimal component detector 404 compares the magnified image $Y_{ILR}$ at a specific position (i, j) with an image around a corresponding position of the pre-magnification image $Y_{LR}$ to find an image patch having the smallest SAD and outputs the found image patch to the high frequency synthesizer 405.

The high frequency synthesizer 405 synthesizes the image $Y_{ILR}$ at the position output from the optimal component detector 404 with the high frequency component $Y_{LR,HF}$ extracted by the high frequency extractor 403, and outputs a synthesized signal to the texture synthesizer 406. The texture synthesizer 406 synthesizes the signal synthesized by the high frequency synthesizer 405 with the texture component $Y_{LR,T}$ extracted by the texture extractor 402 and outputs a finally synthesized signal.

In the case of a moving picture, a finally synthesized signal $Y_{n-1,ILR}''$ in a previous ((n−1)-th) frame is stored in an HR buffer 407, and a finally synthesized signal $Y_{n,ILR}''$ in a next (n-th) frame is obtained using $Y_{n-1,ILR}''$ when a high frequency component is synthesized by the high frequency synthesizer 405 in the next (n-th) frame.

As is apparent from the foregoing description, the present inventive concept synthesizes only image components without a separate external DB, making it possible to enhance sharpness of the outline of images and thus effectively reconstruct fine texture components.

The embodiments described above will be understood as illustrations of the present inventive concept. It will be understood that all features disclosed in association with any one of the embodiments can be used individually or in combination with other disclosed features, used in combination with one or more features of another embodiment of the exemplary embodiments, or used in combination with other embodiments of the embodiments. While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of reconstructing a low-resolution image, comprising:
   extracting a high frequency component and a texture component from the low-resolution image;
   magnifying the low-resolution image from which the high frequency component and the texture component are extracted; and
   reconstructing an image by synthesizing the extracted high frequency component and texture component with the magnified low-resolution image,
   wherein the reconstructing of an image comprises reconstructing an image by finding a position at which a Sum of Absolute Difference (SAD) between brightness values of the pre-magnification low-resolution image and the magnified low-resolution image is the smallest, and synthesizing the magnified low-resolution image which corresponds to the found position with the high frequency component and the texture component which corresponds to the found position.

2. The method of claim 1, wherein the extracting of a high frequency component and a texture component comprises extracting the high frequency component from the pre-magnification low-resolution image using a Low Pass Filter (LPF), and extracting the texture component from the pre-magnification low-resolution image using a Bilateral Filter (BF).

3. The method of claim 1, wherein a process of synthesizing the extracted high frequency component and texture component with the image in which the high frequency component and the texture component are synthesized with the magnified low-resolution image is repeated a predetermined number of times.

4. The method of claim 1, wherein when the image is a moving picture the reconstructing of an image comprises reconstructing an image in a next frame by using a finally synthesized image in a previous frame and a pre-magnification low-resolution image in the next frame.

5. The method of claim 2, wherein the texture component is synthesized on a block basis.

* * * * *